(12) United States Patent
Morrell et al.

(10) Patent No.: US 9,505,368 B2
(45) Date of Patent: Nov. 29, 2016

(54) FASTENER AND FASTENING SYSTEM FOR AN AIRBAG ASSEMBLY

(71) Applicant: TK Holdings Inc, Auburn Hills, MI (US)

(72) Inventors: Jeffrey William Morrell, Berkley, MI (US); Gary A. Card, Macomb, MI (US); Kristin Stephani Harma, White Lake, MI (US); Thomas W. Messner, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/634,315

(22) Filed: Feb. 27, 2015

(65) Prior Publication Data

US 2016/0250989 A1 Sep. 1, 2016

(51) Int. Cl.
| | |
|---|---|
| *B60R 21/16* | (2006.01) |
| *B60R 21/214* | (2011.01) |
| *B60R 21/232* | (2011.01) |
| *B60R 21/231* | (2011.01) |

(52) U.S. Cl.
CPC .......... *B60R 21/214* (2013.01); *B60R 21/232* (2013.01); *B60R 21/23138* (2013.01)

(58) Field of Classification Search
CPC ........................ B60R 21/213; B60R 21/214
USPC ...................... 280/728.2, 730.2; 24/297, 453
See application file for complete search history.

(56) References Cited

U.S. PATENT DOCUMENTS

| | | | |
|---|---|---|---|
| 6,431,585 B1 * | 8/2002 | Rickabus | B60R 21/215 24/114.05 |
| 7,178,205 B2 * | 2/2007 | Nessel | B60R 13/0206 24/289 |
| 7,290,795 B2 | 11/2007 | Kawai et al. | |
| 7,338,068 B2 * | 3/2008 | Kawai | B60R 21/215 24/297 |
| 7,669,883 B2 | 3/2010 | Giddings et al. | |
| 7,887,086 B2 * | 2/2011 | Kalandek | B60R 21/213 248/200 |
| 8,046,880 B2 * | 11/2011 | Katoh | F16B 5/0628 24/297 |
| 8,474,107 B2 | 7/2013 | Baumgartner et al. | |

FOREIGN PATENT DOCUMENTS

| | | |
|---|---|---|
| WO | WO 2009/039276 | 3/2009 |
| WO | WO 2014/078061 | 5/2014 |

* cited by examiner

*Primary Examiner* — Toan To
(74) *Attorney, Agent, or Firm* — Gordon & Rees LLP

(57) ABSTRACT

A fastener for mounting an airbag to a vehicle includes a first fastening element and a second fastening element. The first and second fastening elements are configured to be positioned on opposite sides of an airbag panel. The first fastening element includes a protrusion configured to be positioned within an opening located in the second fastening element. The fastener has a locked condition in which the first and second fastening elements are locked together. A wall of the second fastening element forming the opening includes a recess configured to receive the protrusion when the fastener is in the locked condition. The second fastening element is configured to be rotated relative to the first fastening element in order to change the condition of the fastener to locked.

20 Claims, 4 Drawing Sheets

FASTENER AND FASTENING SYSTEM FOR AN AIRBAG ASSEMBLY

The present application relates generally to the field of airbags and occupant protection systems. More specifically, the present invention relates to a device for securing an airbag to the frame of a vehicle.

BACKGROUND

Air bag assemblies may be provided at a variety of locations within a vehicle interior to protect vehicle passengers. One such airbag assembly is known as a side curtain type airbag module and is generally mounted to the roof rail of the vehicle. Other components, such as headliners, electronics, and trim members may also be mounted to the roof rail. Curtain airbags may be mounted to the roof rail at the same time as other components or may be mounted (e.g., pre-mounted, pre-fixed, etc.) to the roof rail before other components.

SUMMARY

One disclosed embodiment relates to a fastener for mounting an airbag to a vehicle including a first fastening element and a second fastening element. The first and second fastening elements are configured to be positioned on opposite sides of an airbag panel. The first fastening element includes a protrusion configured to be positioned within an opening located in the second fastening element. The fastener has a locked condition in which the first and second fastening elements are locked together. A wall of the second fastening element forming the opening includes a recess configured to receive the protrusion when the fastener is in the locked condition. The second fastening element is configured to be rotated relative to the first fastening element in order to change the condition of the fastener to locked.

Another disclosed embodiment relates to an airbag fastening system for mounting an airbag to a vehicle including a fastener, an airbag, and an inflator configured to provide gas for inflating the airbag. The fastener includes a first fastening element and a second fastening element. The first and second fastening elements are configured to be positioned on opposite sides of an airbag panel. The first fastening element includes a protrusion configured to be positioned within an opening located in the second fastening element. The fastener has a locked condition in which the first and second fastening elements are locked together. A wall of the second fastening element forming the opening includes a recess configured to receive the protrusion when the fastener is in the locked condition. The second fastening element is configured to be rotated relative to the first fastening element in order to change the condition of the fastener to locked. The airbag includes a tab positioned between the first fastening element and the second fastening element. The protrusion is positioned to pass through a hole in the tab.

It is to be understood that both the foregoing general description and the following detailed descriptions are exemplary and explanatory only, and not restrictive of the inventions.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
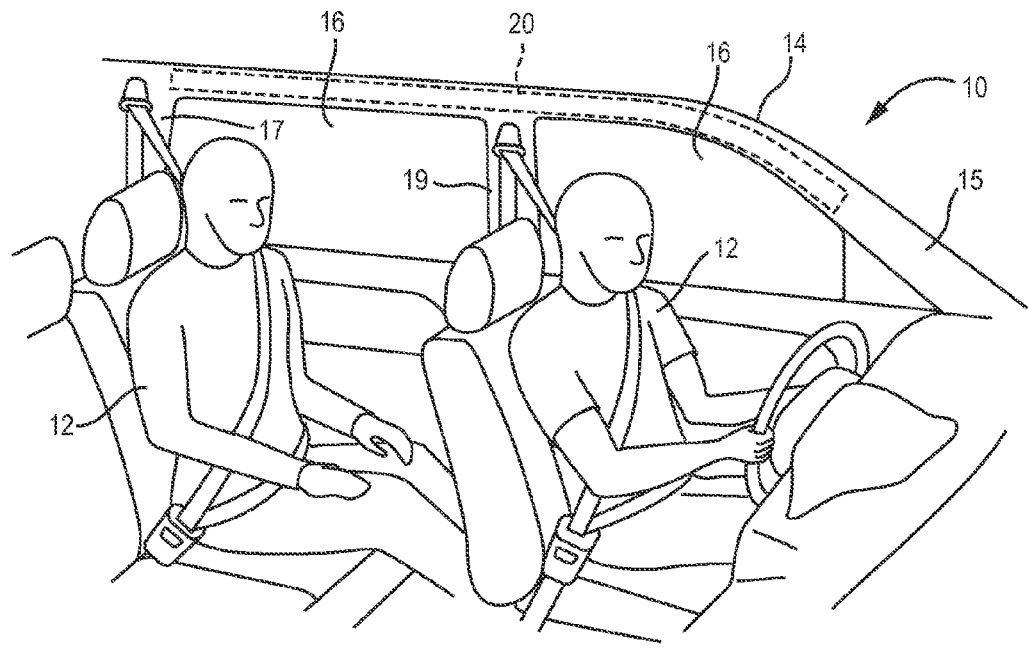
FIG. 1A is a perspective view of the interior of a vehicle, according to an exemplary embodiment.
Figure 1B:
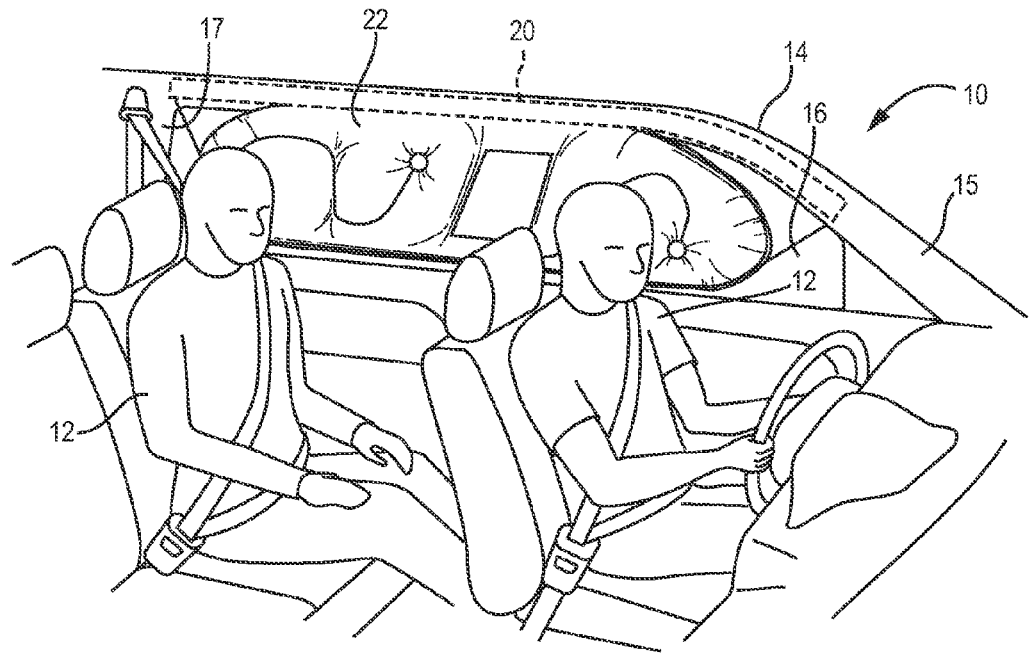
FIG. 1B is a perspective view of a head side impact airbag device deployed in the interior of a vehicle, according to an exemplary embodiment.

FIGS. 1A-1B show a perspective view of a vehicle interior 10 (e.g., occupant compartment, etc.) is shown according to an exemplary embodiment. An airbag device is shown as, for example, a head-side airbag (HSAB) module 20 positioned along a roof rail 14 of the vehicle. The HSAB module 20 may include an airbag cushion 22 inflated by gas provided by a gas generator or inflator 24 and at least one connection element for connecting the airbag cushion 22 to a structural member of the vehicle, such as the roof rail 14 above a window opening 16. The inflator may be mounted along one of pillars of the vehicle frame (e.g., the A pillar 15, the B pillar 19, or the C pillar 17). Thus, the inflator may be considered a rear or mid mount inflator depending on vehicle configuration and desired airbag deployment characteristics. The airbag cushion 22 is preferably secured in a folded state beneath a trim panel (not shown). The trim panel is snapped, screwed, or otherwise secured in place over the inflator and the packed, folded curtain airbag cushion 22.

During a side impact, roll over, frontal impact or frontal offset impact event involving the vehicle, sensors detect an emergency condition resulting in a controller triggering the gas generator or inflator 24, which may be located in the roof rail 14 or roof assembly, to rapidly generate and force gas into the airbag cushion 22. The airbag cushion 22 deploys downwardly away from a storage position and along the side of the vehicle interior 10. The airbag cushion 22 expands in the cross-car direction as gas is forced into the cushion 22 by the inflator. In the deployed position, the airbag cushion 22 is disposed between the occupants 12 and the side of the vehicle and generally covers at least a portion of the window openings 16.

The airbag cushion 22 may be formed from a first panel (e.g., inboard panel, inner panel, front panel, etc.) and a second panel (e.g., outboard panel, outer panel, rear panel, etc.) that are coupled together by a plurality of sewn seams. The first panel and the second panel may comprise nylon fabric. The panels may be sewn together or secured by other suitable methods, such as thermobonding or welding. The panels and the connecting seams may be coated with a sealant in order to reduce the leakage of inflation gas. Preferably, the side curtain type airbag cushion remains inflated for a period of time to protect the occupant from ejection. The airbag cushion 22 may be divided into two or more internal compartments or chambers. Passages or ports may be provided between individual chambers such that the chambers are in fluid communication with each other. The curtain airbag cushion 22 may also include a plurality of uninflated portions that may be positioned to separate the chambers. These uninflated portions are sometimes referred to as zero depth tethers.

Figure 2:
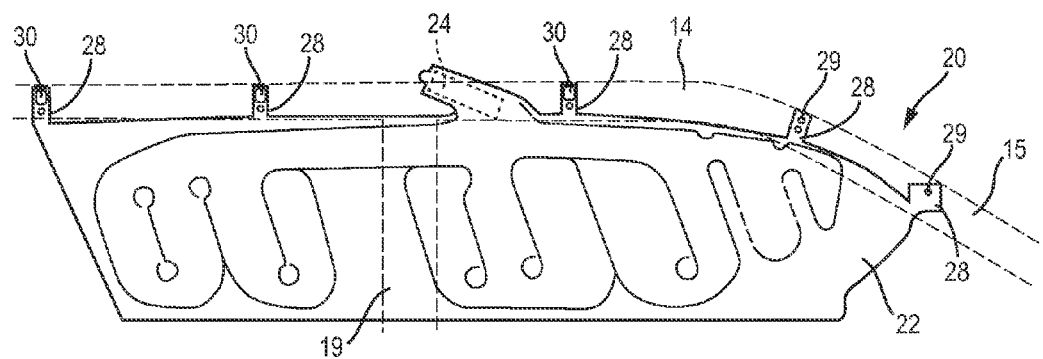
FIG. 2 is a side elevation view of a curtain airbag coupled to a roof rail of the vehicle of FIG. 1A.

In FIG. 2, the airbag module 20 is shown with the airbag cushion 22 in a deployed and deflated state. The airbag cushion 22 includes a number of tabs 28 which extend from the top edge of the airbag cushion 22. Each of the tabs 28 may include one or more mounting holes 29. The tabs 28 may, for example, be extensions of the inboard panel and/or the outboard panel and integrally formed with the inboard and/or outboard panels. Alternatively, the tabs 28 may be formed separately and coupled to the airbag cushion 22, such as with a sewn seam. The airbag cushion 22 is coupled to the vehicle frame, such as the roof rail 14, with fasteners, shown as fixation clips 30. The fixation clips 30 are configured to pass through the holes 29 in the tabs 28. The fixation clips 30 engage openings in the roof rail 14 to mount the airbag cushion 22 to the roof rail 14.

Figure 3:
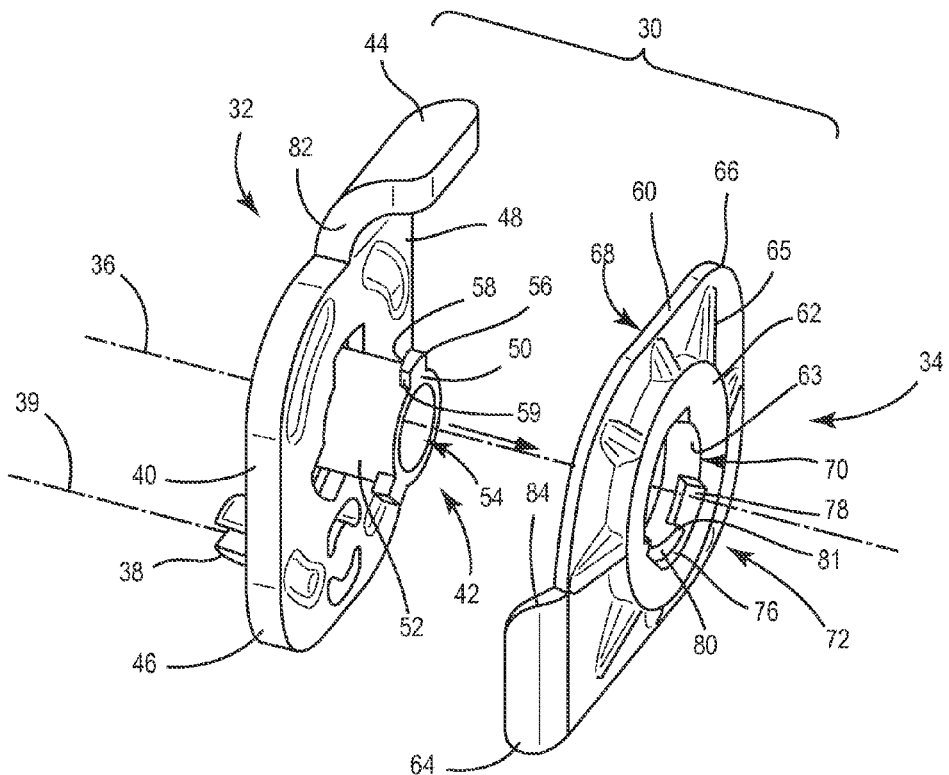
FIG. 3 is an exploded view of a fastener for coupling a curtain airbag to a vehicle frame, according to an exemplary embodiment.

As shown in FIG. 3, the fixation clip 30 includes a first fastening element, shown as a male type clip 32, and a second fastening element, shown as a female type clip 34. The male clip 32 is configured to engage the female clip 34 in such a way that the cushion tab 28 is positioned between the male clip 32 and the female clip 34, and the fixation clip 30 is fixed to the tab 28. The fixation clip 30 further includes a connecting clip portion, shown as a snap fastener 38, that is configured to engage the roof rail 14 or another frame member (e.g., the A pillar 15, the B pillar 19, or the C pillar 17).

The male clip 32 includes a base portion 40, a protrusion 42 extending away from the base portion 40 along a direction substantially parallel to an axis 36, and an extension 44 extending away from the base portion 40 in a direction substantially perpendicular to the axis 36. As shown, the base portion 40 may be a rectangular planar member defining a planar surface 48 that is substantially perpendicular to the axis 36. The corners 46 of the base portion 40 may be rounded to improve the ergonomics of the fixation clip 30 and to facilitate the rotating of the clips 32 and 34 with respect to one another, as described below. The protrusion 42 extends away from the planar surface 48 and includes a generally cylindrical post 50. The post 50 defines an outer cylindrical surface 52 and an opening 54 that extends through the post 50 and through the base portion 40. One or more projections 56 are provided at a distal end of the post 50 and extend outward from the outer cylindrical surface 52. The projection 56 includes a sliding surface 58 that is angled relative to the planar surface 48 and a lock surface 59 that is substantially perpendicular to the planar surface 48.

The protrusion 42 may include two projections 56 that are spaced asymmetrically about outer cylindrical surface 52 of the post 50. The asymmetrical arrangement of the projections 56 facilitates the proper alignment of the male clip 32 relative to the female clip 34. The protrusion 42 may include a single projection 56 or may include three or more projections 56. The projections 56 may be spaced symmetrically about the outer cylindrical surface 52 of the post 50. One or more of the projections 56 may be provided at a location along the length of the post 50 instead of at the distal end of the post 50.

The female clip 34 includes a base portion 60, a central boss 62 extending away from the base portion 60 along a direction substantially parallel to the axis 36, and an extension 64 extending away from the base portion 60 in a direction substantially perpendicular to the axis 36. The base portion 60 may be a rectangular planar member defining a planar surface 68 that is substantially perpendicular to the axis 36. The corners 66 of the base portion 60 may be rounded to improve the ergonomics of the fixation clip 30 and to facilitate the rotating of the clips 32 and 34 with respect to one another, as described below. The boss 62 may be reinforced by features, shown as radial ribs 65. The radial ribs 65 additionally provide contoured elements to facilitate the rotation of the female clip 34. The boss 62 includes a cylindrical surface 63 that defines an opening 70. The opening 70 is sized and shaped to receive the post 50. The boss 62 further defines a recess 72 extending outward from the opening 70 and configured to receive the projection 56. The number and arrangement of the recesses 72 defined by the female clip 34 may vary based on the number and arrangement of the projections 56 of the male clip 32.

The recess 72 includes an entrance portion 74, a ramp portion 76, and a notch 78. The entrance portion 74 extends along the circumference of the cylindrical surface 63 in a direction substantially parallel to the planar surface 68 and further extends across the length of the cylindrical surface 63 in a direction substantially parallel to the axis 36. The entrance portion 74 receives the projection 56 as the post 50 is inserted into the opening 70. The ramp portion 76 extends laterally from the entrance portion 74 about the circumference of the opening 70. The notch 78 extends from the ramp portion 76 in a direction towards the planar surface 68. The notch 78 is sized to receive the projection 56. The ramp portion 76 is defined, in part, by a sliding surface 80 that is angled relative to the planar surface 68. The notch 78 is defined, in part, by a lock surface 81 that is substantially perpendicular to the planar surface 68.

Figure 4A:
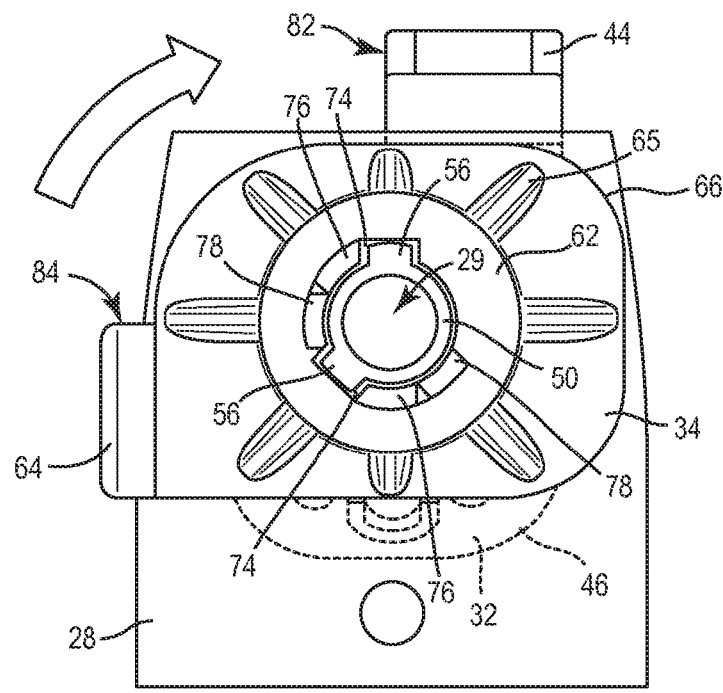
FIG. 4A is a side elevation view of the fastener of FIG. 3 in a first, unlocked condition.
Figure 4B:
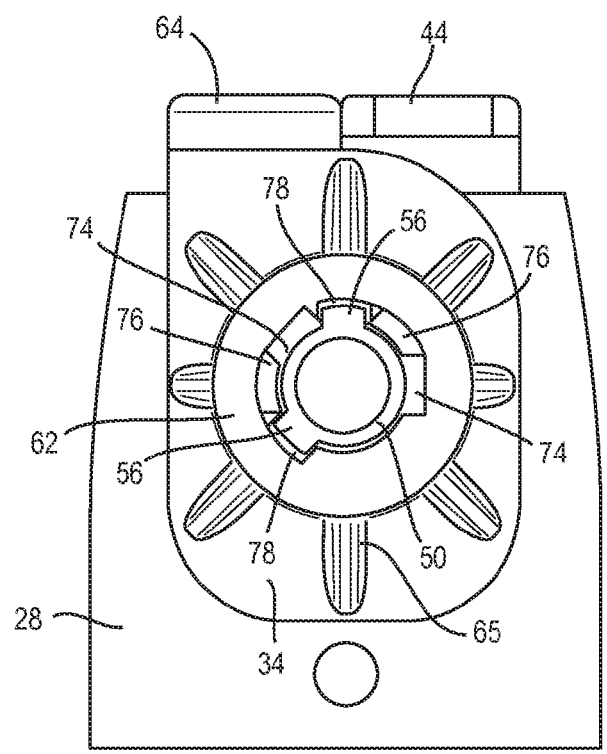
FIG. 4B is a side elevation view of the fastener of FIG. 3 in a second, locked condition.
Figure 5:
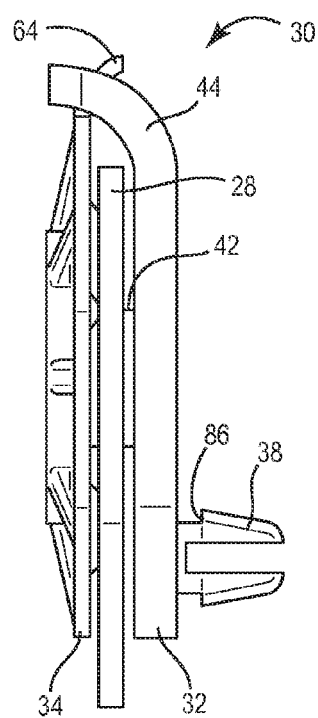
FIG. 5 is a front elevation view of the fastener of FIG. 3 coupled to an airbag cushion.
Figure 6:
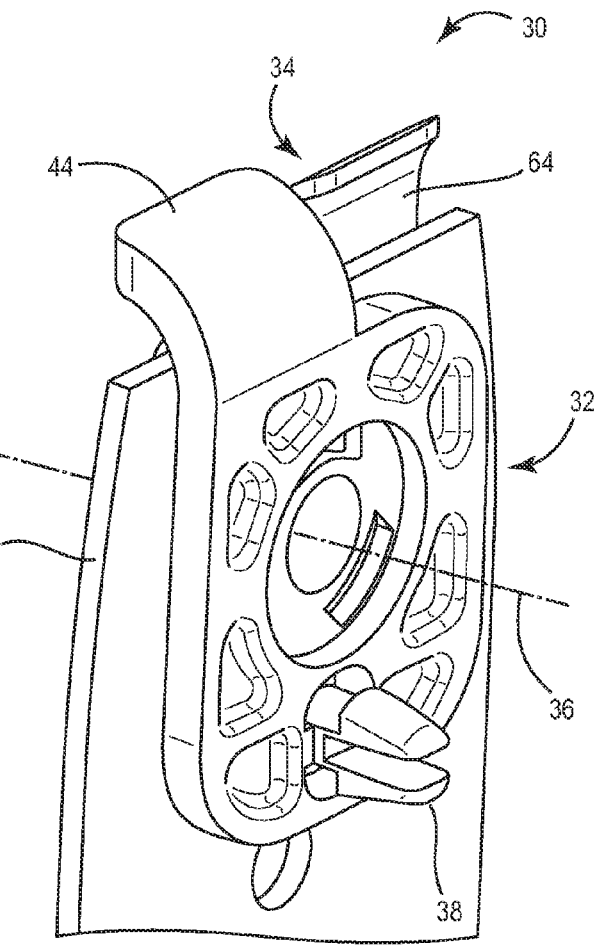
FIG. 6 is a perspective view of the fastener of FIG. 3 coupled to an airbag cushion.

In FIGS. 4A-4B, the fixation clip 30 is shown being moved from an unlocked condition to a locked condition. In the unlocked condition the male clip 32 is not coupled to the female clip 34 and may be pulled away from the female clip 34 along the axis 36. In the locked condition, the male clip 32 is coupled to the female clip 34 and cannot be separated from the female clip 34 along the axis 36, thereby trapping an intermediately positioned member, such as the tab 28 of the airbag cushion 22, between the male clip 32 and the female clip 34.

In order to couple the fixation clip 30 to the airbag cushion 22, the male clip 32 and the female clip 34 are positioned on opposite sides of a tab 28, aligned with one of the mounting holes 29 in the tab 28. The post 50 is inserted through the mounting hole 29. The male clip 32 is moved towards the female clip 34 along the axis 36 such that the post 50 is received in the opening 70 and the one or more projections 56 are received in the one or more entrance portions 74 of the recesses 72. The male clip 32 is then rotated relative to the female clip 34 about the axis 36, moving the projection 56 into the ramp portion 76. As shown in FIGS. 4A and 4B, the post 50 and the opening 70 are preferably cylindrically shaped, allowing for a free rotation of the male clip 32 relative to the female clip 34. Alternatively, the post 50 and the opening 70 may be otherwise shaped (e.g., octagonal) such that the rotation of the male clip 32 relative to the female clip 34 is limited to incremental angles. The sliding surface 58 contacts the sliding surface 80 as the projection 56 is moved along the ramp portion 76. The configuration of the sliding surfaces 58 and 80 forces the male clip 32 to move closer to the female clip 34. This movement may compress the airbag cushion material (e.g., the tab 28) between the planar surfaces 48, 68. Further rotation of the male clip 32 relative to the female clip 34 moves the projection 56 out of the ramp portion 76 and into the notch 78. With the projection 56 in the notch 78, rotation in the opposite direction (e.g., to move the projection 56 back into the ramp portion 76) is obstructed by the contact between the lock surfaces 59 and 81. Also, subsequent decompression of the airbag cushion material (e.g., tab 28) may function to enhance the mating connection between the projection 56 and the notch 78.

The distance between the entrance portion 74 and the notch 78 defines a rotational angle that the projection 56 must travel from the unlocked condition to the locked condition. The rotational angle may be approximately a 90 degree rotation. Alternatively, the rotational angle may be less than 90 degrees (e.g., 60 degrees) or greater than 90 degrees (e.g., 120 degrees). The rotational angle may be reduced, for example, to accommodate a greater number of projections 56 and recesses 72.

The extensions 44, 64 cooperate to limit the rotation of the male clip 32 relative to the female clip 34 and to facilitate the coupling of the male clip 32 and the female clip 34. The extensions 44 and 64 are each curved inward (e.g., toward the planar surfaces 48 and 68, respectively). When being coupled to the tab 28, as illustrated in FIG. 4A, one of the extensions (e.g., extension 44 of the male clip 32) may be oriented in an upward orientation while the other extension (e.g., extension 64 of the female clip 34) may be oriented in a sideways orientation, rotated relative to the other extension by an angle. The female clip 34 may then be intuitively rotated upward, bringing the extension 64 towards the extension 44 and moving the projection 56 into the ramp portion 76. Further, when the projection 56 is received in the notch 78, a contact surface 82 of the extension 44 abuts a contact surface 84 of the extension 64. The rotation of the male clip 32 relative to the female clip 34 is limited, reducing the chance that the projection 56 is damaged by over-rotation. Moreover, when the tab 28 is positioned between the clips 32 and 34, the extensions 44 and 64 may also prevent rotation in the opposite direction from the locked condition by contacting a surface of the tab 28.

The snap fastener 38 extends outward from the fixation clip 30 along an axis 39. As shown, the snap fastener 38 is coupled to the male clip 32, but the snap fastener 38 may be coupled to the female clip 34. The snap fastener 38 includes two or more portions that are tapered towards the distal end. The snap fastener 38 may therefore be inserted into an opening in the roof rail 14 or another frame member along the axis 39 with slight resistance to quickly and easily mount the fixation clip 30 and the airbag module 20. The snap fastener 38 includes an engagement portion 86 that is substantially perpendicular to the axis 39. The snap fastener 38 may be elastically deformed inward as it is inserted into the opening in the roof rail 14 and is then restored to its original state by elastic restoring force once the snap fastener 38 is fully inserted into the opening. The engagement portion 86 prevents the snap fastener 38 from being withdrawn back out of the opening of the roof rail 14.

The snap fastener 38 may be replaced with another fastening device. The fixation clip 30 may include a threaded stud that extends through an opening in the roof rail. A nut may then threadibly engage the threaded stud to mount the fixation clip 30. The fixation clip 30 may further include a non-threaded member that is inserted through an opening in the roof rail to be held in place with another member, such as a pin.

The fixation clip 30 may be further coupled to the frame member. For example, a bolt may be passed through the opening 54 defined by the post 50 and through an aligned opening in the frame member. A nut may then threadibly engage the threaded bolt to and be tightened to a predetermined torque to couple the airbag module 20 to the frame member.

In addition, while shown to be separate components, the male clip 32 and the female clip 34 may be attached to one another via a hinged connection. The clips are brought into the unlocked condition through rotation about an axis defined by the hinged connection. The hinged connection may be formed, for example, by a flexible connector, which is connected to the male clip 32 at one end and to the female clip 34 at the other end. The connector then bends about the axis defining the hinged connection when the clips are brought into the unlocked condition. The connector may be integrally formed with the both of the clips 32, 34. The connector may either be frangible or sufficiently flexible to allow the clips to be further rotated respective to one another about the axis 36 to change to the locked condition. Alternatively, the connector may include any suitable mechanism that permits rotatable movement between the clips 32, 34.

The construction and arrangement of the fastener and the airbag fastening system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A fastener for mounting an airbag to a vehicle comprising:
a first fastening element and a second fastening element, wherein the first and second fastening elements are configured to be positioned on opposite sides of an airbag panel;
wherein the first fastening element includes a protrusion configured to be positioned within an opening located in the second fastening element;
wherein the fastener has a locked condition in which the first and second fastening elements are locked together;
wherein a wall of the second fastening element forming the opening includes a recess configured to receive the protrusion when the fastener is in the locked condition; and
wherein the second fastening element is configured to be rotated relative to the first fastening element when the protrusion is positioned within the opening in order to change the condition of the fastener to locked;
wherein the second fastening element is configured to rotate about an axis of rotation that extends along a length of the protrusion and through the opening.

2. The fastener of claim 1, wherein the recess includes a ramp portion and a notch, wherein, upon rotation of the second fastening element to change the condition of the fastener towards locked, the protrusion is configured to contact the ramp portion, and wherein, when the fastener is in the locked condition, the protrusion is received into the notch.

3. The fastener of claim 1, wherein the second fastening element is rotated 90° to change the condition of the fastener to locked.

4. The fastener of claim 1, wherein the first fastening element and the second fastening element are separate components.

5. The fastener of claim 1, wherein the first fastening element is attached to the second fastening element by a hinge element, wherein the hinge element defines an axis of rotation such that the first fastening element is configured to be rotated about the axis to position the protrusion within the opening of the second fastening element.

6. A fastener for mounting an airbag to a vehicle comprising:
a first fastening element and a second fastening element, wherein the first and second fastening elements are configured to be positioned on opposite sides of an airbag panel;
wherein the first fastening element includes a protrusion configured to be positioned within an opening located in the second fastening element;
wherein the fastener has a locked condition in which the first and second fastening elements are locked together;
wherein a wall of the second fastening element forming the opening includes a recess configured to receive the protrusion when the fastener is in the locked condition;
wherein the second fastening element is configured to be rotated relative to the first fastening element in order to change the condition of the fastener to locked; and
wherein the protrusion includes a post and a projection, wherein the projection extends from a surface of the post and is further configured to be positioned in the recess when the fastener is in the locked condition.

7. The fastener of claim 6, wherein the first fastening element includes a base portion, wherein the post extends from a planar surface of the base portion in a direction substantially perpendicular to the planar surface, and wherein the projection extends outwardly from the post in a direction substantially parallel to the planar surface of the base portion.

8. The fastener of claim 6, wherein the recess includes a ramp portion and a notch, wherein, upon rotation of the second fastening element to change the condition of the fastener towards locked, the projection is configured to contact the ramp portion, and wherein, when the fastener is in the locked condition, the projection is positioned in the notch.

9. The fastener of claim 6, wherein the first fastening element further includes a second projection extending from the surface of the post and the wall of the second fastening element further includes a second recess configured to receive the second projection when the fastener is in the locked condition.

10. The fastener of claim 9, wherein the projection and the second projection extend outward from an outer cylindrical surface of the post and are further provided at one end of the post.

11. The fastener of claim 9, wherein the projection and the second projection are asymmetrically spaced apart on an outer cylindrical surface of the post.

12. An airbag fastening system for mounting an airbag to a vehicle comprising:
a fastener comprising,
a first fastening element and a second fastening element, wherein the first and second fastening elements are configured to be positioned on opposite sides of an airbag panel;
wherein the first fastening element includes a protrusion configured to be positioned within an opening located in the second fastening element;
wherein the fastener has a locked condition in which the first and second fastening elements are locked together;
wherein a wall of the second fastening element forming the opening includes a recess configured to receive the protrusion when the fastener is in the locked condition; and
wherein the second fastening element is configured to be rotated relative to the first fastening element when the protrusion is positioned within the opening in order to change the condition of the fastener to locked;
wherein the second fastening element is configured to rotate about an axis of rotation that extends along a length of the protrusion and through the opening
an airbag comprising a tab positioned between the first fastening element and the second fastening element, wherein the protrusion is positioned to pass through a hole in the tab; and
an inflator configured to provide gas for inflating the airbag.

13. An airbag fastening system for mounting an airbag to a vehicle comprising:
a fastener comprising,
a first fastening element and a second fastening element, wherein the first and second fastening elements are configured to be positioned on opposite sides of an airbag panel;
wherein the first fastening element includes a protrusion configured to be positioned within an opening located in the second fastening element;
wherein the fastener has a locked condition in which the first and second fastening elements are locked together;
wherein a wall of the second fastening element forming the opening includes a recess configured to receive the protrusion when the fastener is in the locked condition; and
wherein the second fastening element is configured to be rotated relative to the first fastening element in order to change the condition of the fastener to locked;
an airbag comprising a tab positioned between the first fastening element and the second fastening element, wherein the protrusion is positioned to pass through a hole in the tab; and
an inflator configured to provide gas for inflating the airbag; and
wherein the protrusion includes a post and a projection, wherein the projection extends from a surface of the post and is further configured to be received into the recess when the fastener is in the locked condition.

14. The airbag fastening system of claim 13, wherein the recess includes a ramp portion and a notch, wherein, upon rotation of the second fastening element to change the condition of the fastener towards locked, the projection is configured to contact the ramp portion, and wherein, when the fastener is in the locked condition, the projection is positioned in the notch.

15. The airbag fastening system of claim 13, wherein the first fastening element includes a base portion, wherein the post extends from a planar surface of the base portion in a direction substantially perpendicular to the planar surface, and wherein the projection extends outwardly from the post in a direction substantially parallel to the planar surface of the base portion.

16. The airbag fastening system of claim 13, wherein the post is positioned in the hole in the tab when the fastener is in the locked condition.

17. The airbag fastening system of claim 15, wherein the first fastening element includes a connecting clip portion on a surface of the first fastening element opposite to the planar surface, and wherein the connecting clip portion is configured to be fixed to a vehicle frame.

18. The airbag fastening system of claim 13, wherein the first fastening element further includes a second projection extending from the surface of the post and the wall of the second fastening element further includes a second recess configured to receive the second projection when the fastener is in the locked condition.

19. The airbag fastening system of claim 18, wherein the projection and the second projection extend outward from an outer cylindrical surface of the post and are further provided at one end of the post.

20. The airbag fastening system of claim 18, wherein the projection and the second projection are asymmetrically spaced apart on an outer cylindrical surface of the post.

* * * * *